United States Patent [19]

Kuwabara et al.

[11] Patent Number: 4,984,811
[45] Date of Patent: Jan. 15, 1991

[54] PRESSURE CONTROL SYSTEM FOR STERN TUBE SEALS

[75] Inventors: Tsuneo Kuwabara, Toyama; Jingo Miyazaki, Uozu, both of Japan

[73] Assignee: Dover Japan, Inc., Tokyo, Japan

[21] Appl. No.: 330,011

[22] Filed: Mar. 29, 1989

[30] Foreign Application Priority Data

Mar. 31, 1988 [JP] Japan .............................. 63-43838[U]

[51] Int. Cl.$^5$ ...................... F16K 41/00; B63H 23/36
[52] U.S. Cl. ................................................ 277/3; 277/27; 277/28; 277/58; 277/59; 440/83; 440/112
[58] Field of Search ................ 277/3, 27, 28, 29, 58, 277/59, 63, 70, 72 R; 440/52, 83, 111, 112

[56] References Cited

U.S. PATENT DOCUMENTS

| | | | |
|---|---|---|---|
| 3,291,491 | 12/1966 | Smith | 277/27 |
| 3,631,834 | 1/1972 | Gardner | 277/3 X |
| 3,653,350 | 4/1972 | Koons et al. | 114/0.5 R |
| 3,740,058 | 1/1973 | Gardner et al. | 277/27 X |
| 3,902,726 | 9/1975 | Hisadu | 277/58 |
| 3,934,952 | 1/1976 | Gardner | 440/12 X |
| 4,085,941 | 4/1978 | Wilkinson et al. | 277/59 X |
| 4,128,248 | 12/1978 | Kabelitz et al. | 277/59 X |
| 4,168,070 | 9/1979 | Tsuchihashi et al. | 277/3 |
| 4,174,672 | 11/1979 | Cox | 277/59 X |
| 4,189,156 | 2/1980 | Geary, Jr. et al. | 277/3 X |
| 4,284,280 | 8/1981 | Bertram et al. | 277/27 |
| 4,448,425 | 5/1984 | von Bergen | 277/59 X |
| 4,460,181 | 7/1984 | Araoka | 277/3 X |
| 4,469,335 | 9/1984 | Moore | 277/27 |
| 4,482,158 | 11/1984 | Ishitani et al. | 277/27 X |
| 4,482,159 | 11/1984 | Ishitani et al. | 277/3 |
| 4,534,569 | 8/1985 | Ishitani et al. | 277/27 |
| 4,565,378 | 1/1986 | Wehrfritz et al. | 277/3 |
| 4,606,652 | 8/1986 | Swearingen | 277/3 X |
| 4,632,403 | 12/1986 | Ishitani et al. | 277/27 |
| 4,865,075 | 9/1989 | Murakami | 277/59 X |

FOREIGN PATENT DOCUMENTS

| | | |
|---|---|---|
| 2643769 | 3/1978 | Fed. Rep. of Germany . |
| 2746592 | 4/1979 | Fed. Rep. of Germany . |
| 2160105 | 5/1973 | France . |
| 47-21787 | 6/1972 | Japan . |
| 47-40477 | 12/1972 | Japan . |
| 49-64999 | 6/1974 | Japan . |
| 50-106397 | 8/1975 | Japan . |
| 61-44397 | 3/1986 | Japan . |
| 269190 | 5/1928 | United Kingdom ............ 277/3 |

Primary Examiner—Allan N. Shoap
Assistant Examiner—Scott Cummings
Attorney, Agent, or Firm—Armstrong Nikaido Marmelstein Kubovcik & Murray

[57] ABSTRACT

A pressure control system for stern tube seals includes at least two resilient radial lip-type seal rings held so as to surround a propeller shaft linear. The closest seal ring lip to the propeller is arranged to face outboard and the other adjacent seal rings' lips are arranged to face suitable directions so as to form annular chambers. The aft annular chamber located most closely to the propeller serves as a chamber having a fixed differencial pressure higher than the seawater pressure. The closest seal ring to the propeller is lifted, thereby allowing air to be bled into seawater and preventing the ingress thereof. A regulator unit which is capable of instantly ascertaining changes in the hull's draft is provided in an air-supplying mechanism communicating with the aft annular chamber, so as to maintain the air pressure therein higher than the seawater pressure by a constant differential pressure. A pressurized oil-circulating mechanism is adapted to communicate with an adjacent annular chamber to the aft annular chamber, i.e., an oil chamber, and to fill the adjacent annular chamber with fluid for maintaining a fixed differential pressure in response to the air pressure within the aft annular chamber, thereby preventing the leakage of lubricating oil contained in the stern tube to outboard the ship.

6 Claims, 2 Drawing Sheets

PRESSURE CONTROL SYSTEM FOR STERN TUBE SEALS

BACKGROUND OF THE INVENTION

The present invention relates to a pressure control system for stern tube seals, and more particularly to a system for controlling the pressure within annular chambers defined by adjacent seal rings in stern tube seals using jointly compressed air and pressurized oil.

Since stern tube seals of a radial lip type formed of resilient material have come to be used in general ships, the pressure applied to the seal rings have increased due to the tendency toward the use of large ships with resultant increase in the draft pressure. Consequently, the number of troubles in which the seal rings become damaged have increased, and the resultant leakage of oil to the outboard of ships presents the problem of environmental pollution. Hence, various proposals have hitherto been made to cope with this problem. In such proposals, the basic technological concept has been that the oil pressure inboard the stern tube should be set at a level higher (approx. 0.3 kg/cm$^2$f) than the seawater pressure, thereby ultimately preventing the ingress of seawater into the stern tube. This concept has been adopted as a basic rule since the invention of the stern tube seals. Accordingly, in the conventional stern tube seals, a system for automatically adjusting the lubricating oil pressure, which is adapted to vary the lubricating oil pressure within the stern tube in response to the fluctuations of the draft, is arranged as follows: an air purge chamber is provided at the vicinity of centerline of the tail shaft to detect a pressure corresponding to the draft with a sensor, the detected signal is then converted into a pneumatic pressure with a differencial pressure transmitter to actuate a pressure regulator, a regulating valve, etc., thereby adjusting the pressure within the stern tube.

In this system, however, the various devices themselves constituting the system are very complicated and expensive. In addition, a time lag is caused in operation, which gives rise to a phase differential in pressure fluctuations between the respective adjacent annular chambers, resulting in leakage of oil into seawater, which has been a major problem in environmental pollution. In addition, although small stern tube seals have also been used which make use of compressed air as a pressure medium for the annular chamber between the adjacent seal rings, the flow rate of compressed air leaking to the outboard tends to be large, which results in an increased amount of compressed air consumed. Hence, there have been such problems as excessive power loss and maintenance expense being required.

SUMMARY OF THE INVENTION

Accordingly, an object of the present invention is to provide a pressure control system for stern tube seals which has a simple structure and can be produced at low cost and is capable of overcoming the above-described problems of the conventional art.

To this end, according to the present invention, there is provided a pressure control system for stern tube seals including at least two resilient radial lip-type seal rings brought into sliding contact with a propeller shaft liner and a housing member which is secured to a stern frame member of a hull in such a manner as to surround a propeller shaft and is adapted to hold the seal rings, the lip of the seal ring disposed most closely to the propeller side being arranged to face outboard while the lip of an adjacent seal ring to the seal ring being arranged to face inboard so as to form an aft annular chamber, the lips of the other seal rings being sequentially arranged in such a manner as to face suitable directions to form adjacent annular chambers, the pressure control system for stern tube seals comprising: an air-supplying mechanism disposed in the aft annular chamber and adapted to fill the aft annular chamber with compressed air which is higher by a differential pressure in response to the seawater pressure and to bleed air into the seawater, thereby preventing the ingress of the seawater; and a pressurized oil-circulating mechanism disposed in the annular chamber adjacent to the aft annular chamber or the stern tube bearing chamber adjacent to the aft annular chamber and adapted to fill the adjacent annular chamber with a fluid which is maintained at a fixed differential pressure in response to the air pressure within the aft annular chamber, thereby preventing the leakage of lubricating oil contained int he stern tube to the outboard of the ship. Incidentally, the above-mentioned stern tube bearing chamber is applicable to the case where the number of the seal rings being included in the system is two.

Another object of the present invention is to provide a pressure control system for stern tube seals in which the aft annular chamber serves as a bleeding chamber so that the closest seal ring lip to the propeller side is a variable outlet.

Other object of the invention is to provide a pressure control system for stern tube seals in which the compressed air filled in the aft annular chamber is controlled with a pressure regulator unit acting in response to fluctuations of the air pressure bled from the aft annular chamber against fluctuations of seawater pressure so as to maintain the former pressure higher than the latter pressure by the fixed differential pressure constantly.

Other object of the invention is to provide a pressure control system for stern tube seals in which the pressurized oil in the adjacent annular chamber to the aft annular chamber or the stern tube bearing chamber is circulated through an oil tank and a pump, and an air booster relay is provided into an air communicating pipe on an upper portion of the oil tank so that an air branch pipe of the compressed air-supplying mechanism disposed in the aft annular chamber is communicating with the air booster relay.

Further other object of the invention is to provide a pressure control system for stern tube seals in which, in cases where seawater or lubricating oil has entered the aft annular chamber, a drain tank provided with an air vent pipe having a flow rate-restrictor in an upper portion thereof is communicated with the aft annular chamber so as to facilitate the discharge of a fluid leaking into the aft annular chamber.

The above and other objects, features and advantages of the present invention will become more apparent from the following detailed description of the invention when read in conjunction with the accompanying drawings.

BRIEF DESCRIPTION OF THE DRAWINGS:

The drawings illustrate an embodiment of the present invention in which.

DESCRIPTION OF THE PREFERRED EMBODIMENTS

Figure 1:
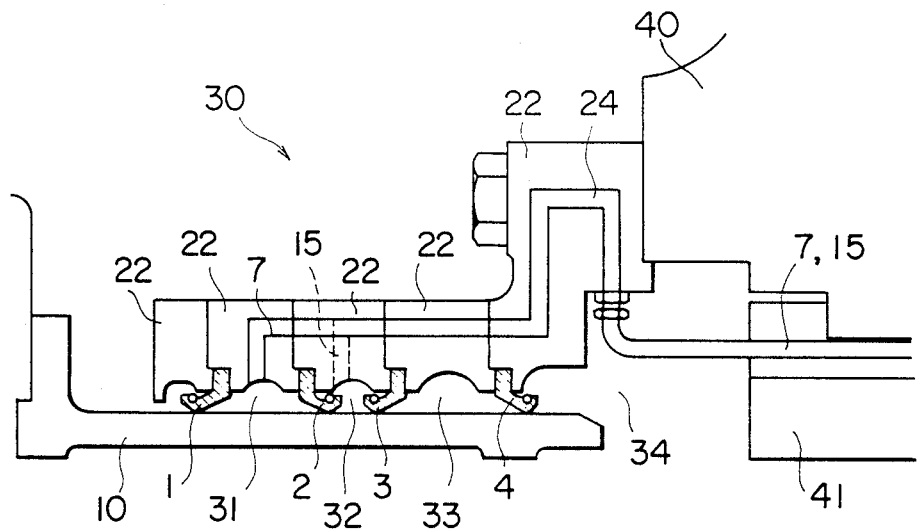
FIG. 1 is a vertical sectional view illustrating the half structure of a stern tube seal assembly in accordance with the present invention.
Figure 2:
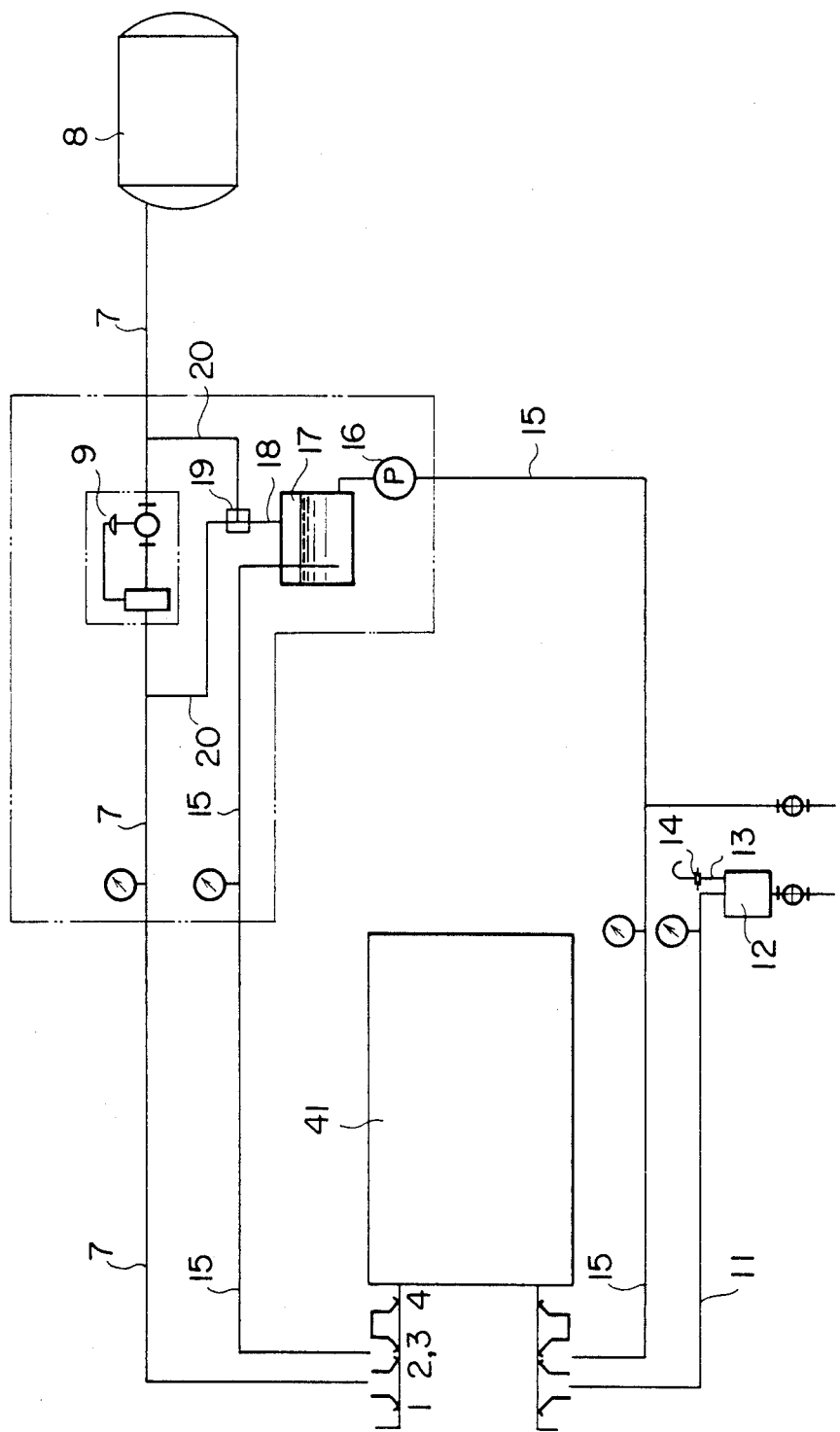
FIG. 2 is a system diagram illustrating a mechanism for supplying compressed air and oil for the assembly shown in FIG. 1.

Referring now to FIGS. 1 and 2, a description will be given of a pressure control system for stern tube seals of the present invention in accordance with the embodiments. In FIGS. 1 and 2, seal rings 1, 2, 3, 4 of a radial lip type, formed of an elastomeric material, are held by a housing member 22 of a stern tube seal 30 and are brought into sliding contact with a propeller shaft liner 10. The lip of the seal ring 1 disposed most closely to the propeller side among the seal rings is arranged facing the outboard direction; the lip of the seal ring 2 is arranged facing the inboard direction; the lip of the seal ring 3, facing the outboard direction; and the lip of the seal ring 4, facing the inboard direction, thereby respectively forming an aft annular chamber 31, adjacent annular chambers 32, 33, and an aft-end recess 34 of a stern tube bearing 41. A pipeline 7—7 is a compressed air-supplying pipe communicating between a compressed air tank 8, i.e., an inboard pressure-supplying source, and the aft annular chamber 31. The pressure of the pipeline 7—7 is constantly maintained to a level slightly higher than the seawater pressure by approx. 0.3 kg/cm$^2$ so as to be supplied to the aft annular chamber 31. As described above, since the air within the aft annular chamber 31 is higher than the seawater pressure, the lip of the seal ring 1 is lifted against the seawater pressure and its own radial lip force and forms a gap at the seal-to-liner interface, as is apparent from the characteristics of the configuration of a radial lip-type seal ring. This gap constitutes an outlet of the bleeding chamber so as to bleed the air within the aft annular chamber 31 into the seawater in the form of bubbles, but the seawater does not enter the aft annular chamber 31.

As the seawater pressure, to which the seal ring 1 is subjected, constantly changes due to the effects of the loaded condition of the ship, waves, etc., unless the air pressure supplied to the aft annular chamber 31 is capable of constantly maintaining a fixed differential pressure in correspondence with changes in this seawater pressure, the balance of sealing the seawater would become lost, or an excessive force would act on the seal ring 1. For this reason, a constant flow type pressure regulator unit 9 is provided at an appropriate position in the pipeline 7—7 between the compressed air tank 8 and the aft annular chamber 31. When the draft of the ship decreases, and the seawater pressure becomes small, a differential pressure with the seawater pressure becomes small. As a result, the radial lip force applied to the lip of the seal ring 1 lowers, and the lip is lifted further by the air pressure within the aft annular chamber, which causes its gap with the liner 10 to increase, causing the amount of air bled into the seawater to increase. In that case, the secondary-side pressure of the constant flow type pressure regulator unit 9 is reduced, which causes a diaphragm in the regulator unit 9 to narrow its valve portion, thereby decreasing the flow rate and setting the flow rate to the initially set flow rate.

When the draft of the ship increases, the radial lip force applied to the seal ring 1 increases, and the force of the air within the aft annular chamber 31 to lift the lip of the seal ring 1 lowers. Accordingly, the gap between that lip and the liner 10 becomes small, and the flow rate of air bled to the seawater consequently decreases. As a result, the secondary pressure of the regulator unit 9 becomes large, and the diaphragm inside the regulator unit 9 expands the valve portion, thereby increasing the flow rate and returning the flow rate to the initially set flow rate. It is also possible to use a constant pressure type pressure regulator unit instead of the constant flow type pressure regulator unit. Incidentally, it goes without saying that these operations of the regulator unit 9 are carried out instantly.

A pipeline 11 is a fluid discharging pipeline, and in cases where seawater has entered the aft annular chamber 31 or lubricating oil within the adjacent annular chamber 32 has entered the aft annular chamber 31, the pipeline 11 is adapted to discharge the same into the ship and communicates between a lower portion of the aft annular chamber and a closed drain tank 12 inside the ship. An air vent pipe 13 provided with a flow-rate restrictor 14 such as an orifice or a needle valve is provided on the upper portion of the drain tank 12. Since a slight amount of the compressed air inside the drain tank 12 is constantly discharged with the flow-rate restrictor 14, the flow of the fluid flowing into the pipeline 11 from the aft annular chamber 31 is aided by the air flow, thereby allowing said fluid to flow into the drain tank 12 in a forced manner.

A pipeline 15—15 communicating with the adjacent annular chamber 32 is a pressurized oil-circulating pipeline, and is adapted to circulate pressurized oil with an oil pump 16 via an oil tank 17 located at an appropriate position in the ship. The air outlet side of an air booster relay 19 is made to communicate with an air communicating pipe 18 provided on the upper portion of the oil tank 17. An air branch pipe 20 is branched off from both the upstream and downstream sides of the constant flow type pressure regulator unit 9 in the compressed air pipeline 7—7 and is made to communicate with both the air inlet side and the signal input side of the booster relay 19. The pressurized oil circulating through the adjacent annular chamber 32 is set to a level slightly higher than the air pressure of the aft annular chamber 31. With respect to the air pressure inside the aft annular chamber 31 corresponding to the change in the seawater pressure, the air having a pressure which is constantly higher than the compressed air within the aft annular chamber 31 by a fixed differential pressure applies an additional force to the oil level in the oil tank 17 by the operation of the air booster relay 19 in which the air pressure controlled by the constant flow type pressure regulator unit 9 is used as a signal. The oil in the oil tank 17 thus pressurized is circulated to the adjacent annular chamber 32 via the pump 16.

As described above, in accordance with the pressure control system for stern tube seals of the present invention, pressure adjustment is made in such a manner that the compressed air within the aft annular chamber overcomes the radial lip force of the seal ring 1 and the seawater pressure so as to effect bleeding only to the seawater side. The aft annular chamber serves both as a bleeding chamber and a sealing chamber to prevent the ingress of seawater. Since the seal ring 1 exhibits an effect as a check valve due to the direction of the lip and its own radial lip force, the amount of air discharged can be held to a very small level. In addition, since the seal ring 1 is constantly lifted over the propeller shaft liner, the seal ring 1 exhibits a sealing function without being substantially brought into contact with the propeller shaft liner. As a result, the amount of sliding heat generated is small, so that the life of the seal is extended drastically. In addition, the oil pressure within the adjacent annular chamber 32 is constantly maintained at a level higher than the air pressure within the aft annular chamber by a fixed differential pressure, and the adjacent annular chamber 32 hence effects lubtication and cooling for the seal rings 2 and 3, and prevents the leakage of the stern tube lubricating oil to the outboard of the ship. Should air enter the adjacent annular chamber from the aft annular chamber, the entered air passes the air communicating pipe from the upper portion of the oil tank and is discharged to the atmosphere inboard the ship through the discharge port of the air booster relay.

In addition, the pressure control system for stern tube seals in accordance with the present invention is capable of overcoming the problems encountered in the complicated system constitution of the conventional apparatus for automatically adjusting the lubricating oil in the stern tube which uses various sensors, transmitters and the like. Specifically, the apparatus in accordance with the present invention is capable of instantly coping with the leakage of seawater or oil occurring due to the phase difference in pressure fluctuations between the respective annular chambers caused by a time lag in operation.

There will now be obvious to those skilled in the art many modifications and variations of the above-described invention. These modifications and variations will not depart from the scope of invention if defined by the following claims.

What is claimed is:

1. A pressure control system for stern tube seals including at least two resilient radial lip-type seal rings brought into sliding contact with a propeller shaft liner and a housing member which is secured to a stern frame member of a hull in such a manner as to surround a propeller shaft and adapted to hold said seal rings, the lip of one of said seal rings being disposed most closely to the propeller side and being arranged to face outboard, the lip of a seal ring adjacent to said one seal ring being arranged to face inboard so as to form an aft annular chamber, and the lips of other adjacent seal rings being sequentially arranged in such a manner as to face suitable directions to form adjacent annular chambers, said pressure control system comprising:

an air-supplying mechanism disposed in said aft annular chamber and for filling said aft annular chamber with compressed air which is higher by a differential pressure in response to the seawater pressure and to bleed air between said shaft liner and said seal ring being disposed most closely to the propeller side into the seawater, thereby preventing the ingress of the seawater; and pressurized oil-circulating mechanism disposed in an adjacent annular chamber adjacent to the aft annular chamber and for filling said adjacent annular chamber with a fluid which is maintained at a fixed positive differential pressure in response to the air pressure within said aft annular chamber, thereby preventing the leakage of lubricating oil contained in said stern tube to the outboard of the ship.

2. A pressure control system for stern tube seals according to claim 1, wherein said aft annular chamber serves as a bleeding chamber which opens the lip of said one seal ring disposed most closely to the propeller side.

3. A pressure control system for stern tube seals according to claim 1, wherein the compressed air filled in said aft annular chamber is controlled by a constant flow type pressure regulator unit which is operated in response to fluctuations in the seawater pressure.

4. A pressure control system for stern tube seals according to claim 1, wherein the compressed air filled in said aft annular chamber is controlled by a constant pressure type pressure regulator unit which is operated in response to fluctuations in the seawater pressure.

5. A pressure control system for stern tube seals according to claim 1, wherein the pressurized oil in said adjacent annular chamber to the aft annular chamber is circulated via an oil tank and a pump, an air booster relay being provided into an air communicating pipe on an upper portion of said oil tank, and an air branch pipe of said compressed air-supplying mechanism disposed in said aft annular chamber being communicated with said air booster relay.

6. A pressure control system for stern tube seals according to claim 1, wherein a drain tank provided with an air vent pipe having a flow rate-restrictor in an upper portion thereof is communicated with said aft annular chamber so as to facilitate the discharge of a fluid leaking into said aft annular chamber.

* * * * *